(12) United States Patent
Casamatta

(10) Patent No.: US 6,243,794 B1
(45) Date of Patent: Jun. 5, 2001

(54) DATA-PROCESSING SYSTEM WITH CC-NUMA (CACHE-COHERENT, NON-UNIFORM MEMORY ACCESS) ARCHITECTURE AND REMOTE CACHE INCORPORATED IN LOCAL MEMORY

(75) Inventor: Angelo Casamatta, Milan (IT)

(73) Assignee: Bull HN Information Systems Italia S.p.A., Turin (IT)

( * ) Notice: Subject to any disclaimer, the term of this patent is extended or adjusted under 35 U.S.C. 154(b) by 0 days.

(21) Appl. No.: 09/006,008

(22) Filed: Jan. 12, 1998

(30) Foreign Application Priority Data

Oct. 10, 1997 (EP) .................................................. 97830508

(51) Int. Cl.[7] ..................................................... G06F 12/08
(52) U.S. Cl. ......................... 711/153; 711/147; 711/129; 711/148; 711/141
(58) Field of Search ................................... 711/141, 147, 711/148, 153

(56) References Cited

U.S. PATENT DOCUMENTS

| | | | |
|---|---|---|---|
| 5,113,510 | * | 5/1992 | Hillis ..................................... 711/121 |
| 5,287,481 | * | 2/1994 | Lin ........................................ 711/135 |
| 5,802,578 | * | 9/1998 | Lovett ................................... 711/147 |
| 5,848,434 | * | 12/1998 | Young et al. .......................... 711/144 |
| 5,897,664 | * | 4/1999 | Nesheim et al. ...................... 711/206 |
| 6,073,225 | * | 6/2000 | James et al. .......................... 711/202 |

FOREIGN PATENT DOCUMENTS 0 603 801    6/1994 (EP) .

OTHER PUBLICATIONS

Iwasa et al. "SSM–MP: More Scalability In Shared–Memory Multi–Processor" Proceedings. International Conference on Computer Design, Oct. 2, 1995, pp. 558–563.

Lenoski et al: The Directory–Based Cache Coherence Protocol for the Dash Multiprocessor The 17th Annual International Symposium on Computer Architecture, May 28–31, 1990.

Wilson et al: "Hiding Shared Memory Reference Latency on the Galactica Net Distributed Shared Memory Architecture1" Journal of Parallel and Distributed Computing, vol. 15, No. 4 Aug. 1, 1992.

Scalabe Shared–Memory Multiprocessing, 1995, Lenoski, et al., pp. 148–150.*

* cited by examiner

*Primary Examiner*—Matthew Kim
*Assistant Examiner*—Christian P. Chace
(74) *Attorney, Agent, or Firm*—Nixon & Vanderhye P.C.

(57) ABSTRACT

A data-processing system with cc-NUMA architecture including a plurality of nodes each constituted by at least one processor intercommunicating with a DRAM-technology local memory using a local bus, the nodes intercommunicating using remote interface bridges and at least one intercommunication ring. The at least one processor has access to a system memory space defined by memory addresses. Each node includes a unit for configuring the local memory, for uniquely mapping a first portion of the system memory space, which is different for each node, onto a portion of the local memory and for mapping the portion of the system memory space which as a whole is uniquely mapped onto a portion of the local memory of all the other nodes onto the remaining portion of the local memory, and a SRAM-technology memory for storing labels with associated with a block of data stored in the remaining portion of local memory and each comprising an index identifying the block and bits indicating a coherence state of the block so that the remaining portion of local memory in each node constitutes a remote cache of the node.

3 Claims, 3 Drawing Sheets

DATA-PROCESSING SYSTEM WITH CC-NUMA (CACHE-COHERENT, NON-UNIFORM MEMORY ACCESS) ARCHITECTURE AND REMOTE CACHE INCORPORATED IN LOCAL MEMORY

TECHNICAL FIELD

The present invention relates to a data-processing system with cc-NUMA architecture.

BACKGROUND OF THE INVENTION

It is known that, in order to overcome the limitations of scalability of symmetrical multi-processor architectures (several processors connected to a system bus by means of which they have access to a shared memory), amongst various solutions, a new type of architecture defined as "cache-coherent, non-uniform memory access" architecture has been proposed.

This modular architecture is based on the grouping of the various processors in a plurality of "nodes" and on the division of the working memory of the system into a plurality of local memories, one per node.

Each node thus comprises one or more processors which communicate with the local memory by means of a local bus. Each node also comprises a bridge for interconnecting the node with other nodes by means of a communication channel in order to form a network of intercommunicating nodes.

The communication channel, which is known per se, may be a network (a mesh router), a ring, several rings, a network of rings, or the like.

Each processor of a node can access, by means of the interconnection bridge and the communication channel, data held in the local memory of any of the other nodes, which is regarded as remote memory, by sending a message to the node, the memory of which contains the required data.

Whereas operations by a processor to access the local memory in the same node are fairly quick and require only access to the local bus and the presentation, on the local bus, of a memory address, of a code which defines the type of operation required and, if this is writing, the presentation of the data to be written, in the case of data resident in or destined for other nodes, it is necessary, as well as accessing the local bus, to activate the interconnection bridge, to send a message to the destination node by means of the communication channel, and by means of the interconnection bridge and the local bus of the destination node to obtain access to the memory resources of the destination node which supplies a response message including the data required where appropriate, by the same path.

Even if they are carried out by hardware without any software intervention, these operations take much longer (even by one order of magnitude) to execute than local memory-access operations.

For this reason, architecture of this type is defined as "NUMA" architecture.

It is advisable to reduce access time as much as possible, both in the case of local memory access and in the case of access to the memories of other nodes.

For this purpose, the various processors are provided, in known manner, with at least one cache and preferably two associative cache levels for storing blocks of most frequently-used data which are copies of blocks contained in the working memory.

Unlike the local memories which, for cost reasons, constituted by large-capacity dynamic DRAM memories, the caches are implemented by much faster static "SRAM" memories and are associative (at least the first-level ones are preferably "fully associative").

A problem therefore arises in ensuring the coherence of the data which is replicated in the various caches and in the local memories.

Within each node this can be achieved very simply, in known manner, by means of "bus watching" or "snooping" operations on the local bus and the use of suitable coherence protocols such as, for example, that known by the acronym MESI.

However, the first- and second-level caches associated with each processor of a node may also contain data resident in the local memory or in the caches of other nodes.

This considerably complicates the problem of ensuring the data coherence.

In fact any local data resident in the local memory of a node may be replicated in one or more of the caches of other nodes.

It is therefore necessary for every local operation which modifies or implicitly invalidates a datum in the local memory of the node (by modification of a datum which is in a cache and which is a replica of data resident in the local memory) to be communicated to the other nodes in order to invalidate any copies present therein (it is generally preferred to invalidate copies rather than updating them since this operation is simpler and quicker).

To avoid this burden which limits the performance of the system, it has been proposed (for example, in Proceedings of the 17th Annual International Symposium on Computer Architecture, IEEE 1990, pages 148–159: D Lenosky, J. Laudon, K. Gharachorloo, A. Gupta, G. Hennessy "The Directory-Based Cache Coherence Protocol for the DASH Multiprocessor") to associate with every local memory a directly mapped "directory" which is formed with the same technology as the local memory, that is DRAM technology, and which specifies, for each block of data in the local memory, whether and in which other nodes it is replicated and possibly whether it has been modified in one of these nodes.

As a further development, to reduce the size of the directory and to increase its speed, it has been proposed to form this directory as an associative static SRAM memory.

Only the transactions which require the execution of coherence operations are thus communicated to the other nodes.

On the other hand, it is necessary to bear in mind that a datum stored in the local memory of one node may be replicated in a cache of another node and may be modified therein.

It is therefore necessary, when the modification takes place, for the operation to be indicated to the node in which the local memory is resident in order to update the state of the directory and possibly to invalidate copies of the data resident in the cache.

The use of the directory associated with the local memory ensures the coherence of the data between the nodes; these architectures are therefore defined as cc-NUMA architectures.

However, the use of a directory associated with the local memory does not solve the problem of speeding up access to data resident in the local memory of other nodes and thus improving the performance of the system as a whole.

To achieve this result, use is made of a so-called remote cache (RC) which stores locally in a node the blocks of data most recently used and retrieved from remote memories, that is, from the local memories of other nodes.

This remote cache, which has to serve all of the processors of a node, is a third-level cache additional to the caches of the various processors of the node.

Known systems with cc-NUMA architecture therefore integrate this remote cache as a component associated with the interconnection bridge or remote controller of the node with the consequence that the remote cache is fast but of limited capacity if implemented as a static SRAM memory, or of large capacity but slow both in executing the access operation and in validating/invalidating it, if implemented as a DRAM.

It has also been proposed to implement the remote cache with a hybrid structure, as DRAM for storing blocks of data and as SRAM for storing the "TAGS" identifying the blocks and their state, so as to speed up the validation/invalidation of the access operations and the possible activation of the exchange of messages between nodes, if required.

However, the implementation of the remote cache as an independent memory also requires the support of a dedicated memory control unit and is inflexible because, although the memory capacity can be configured within the design limits and is predetermined at installation level, it depends on the number of memory components installed and is not variable upon the initialization (booting) of the system in dependence on user requirements which may arise at any particular time.

SUMMARY OF THE INVENTION

These limitations of the prior art are overcome, with the achievement of a structural simplification and generally improved performance, by the data-processing system with cc-NUMA architecture of the present invention in which a remote cache is implemented as a static SRAM memory for storing the "TAGS" identifying the blocks of data and their state and as dynamic DRAM memory constituted by a portion of the local memory for storing the blocks of data.

The latter (the local memory) is constituted, in known manner, by a plurality of memory modules of which a variable number may be installed, and is thus of a size or capacity which can be expanded according to need (if necessary even with the use of modules having different capacities) and has a control and configuration unit which defines its configuration when the system is booted on the basis of the number and capacity of the modules installed and other parameters which may be set during booting, such as, for example, a predetermined level of interleaving.

For the purposes of the present invention, one of the parameters may in fact be the size of the remote cache.

As well as benefitting from the advantages offered by the dual (DRAM-SRAM) implementation technology already discussed, the remote cache thus obtained also has the following advantages:

it is flexible because its size can be selected according to need upon booting solely with the limitations imposed by the configuration "resolution" permitted by the control and configuration unit and by the size of the associated SRAM which is installed and which defines the maximum capacity of the remote cache, it is not burdened with the additional cost of a dedicated control unit with respective timing and refreshing logic since all of these functions are performed by the control and configuration unit of the local memory, it can benefit from all of the functionality provided for by the local memory sub-system, such as a high degree of parallelism, interleaved architecture, reconfigurability in the event of breakdown, etc., at local bus level it reduces the number of loads connected to the data channel of the local bus with a consequent increase in transfer speed.

The only drawback, for which the resulting advantages largely compensate is that, if maximum structural simplicity of the memory control and configuration unit is to be maintained, the remote cache RC must be directly mapped.

However, there is nothing to prevent a portion of the local memory from being organized as a plurality of associative sets.

BRIEF DESCRIPTION OF THE DRAWINGS

The characteristics and advantages of the invention will become clearer from the following description of a preferred embodiment of the invention and from the appended drawings, in which.

DETAILED DESCRIPTION OF THE PREFERRED EMBODIMENT

Since the general aspects of cc-NUMA architecture are well known and the system of the present invention does not depart from these, a brief description of these aspects will suffice for an understanding of the present invention.

Figure 1:
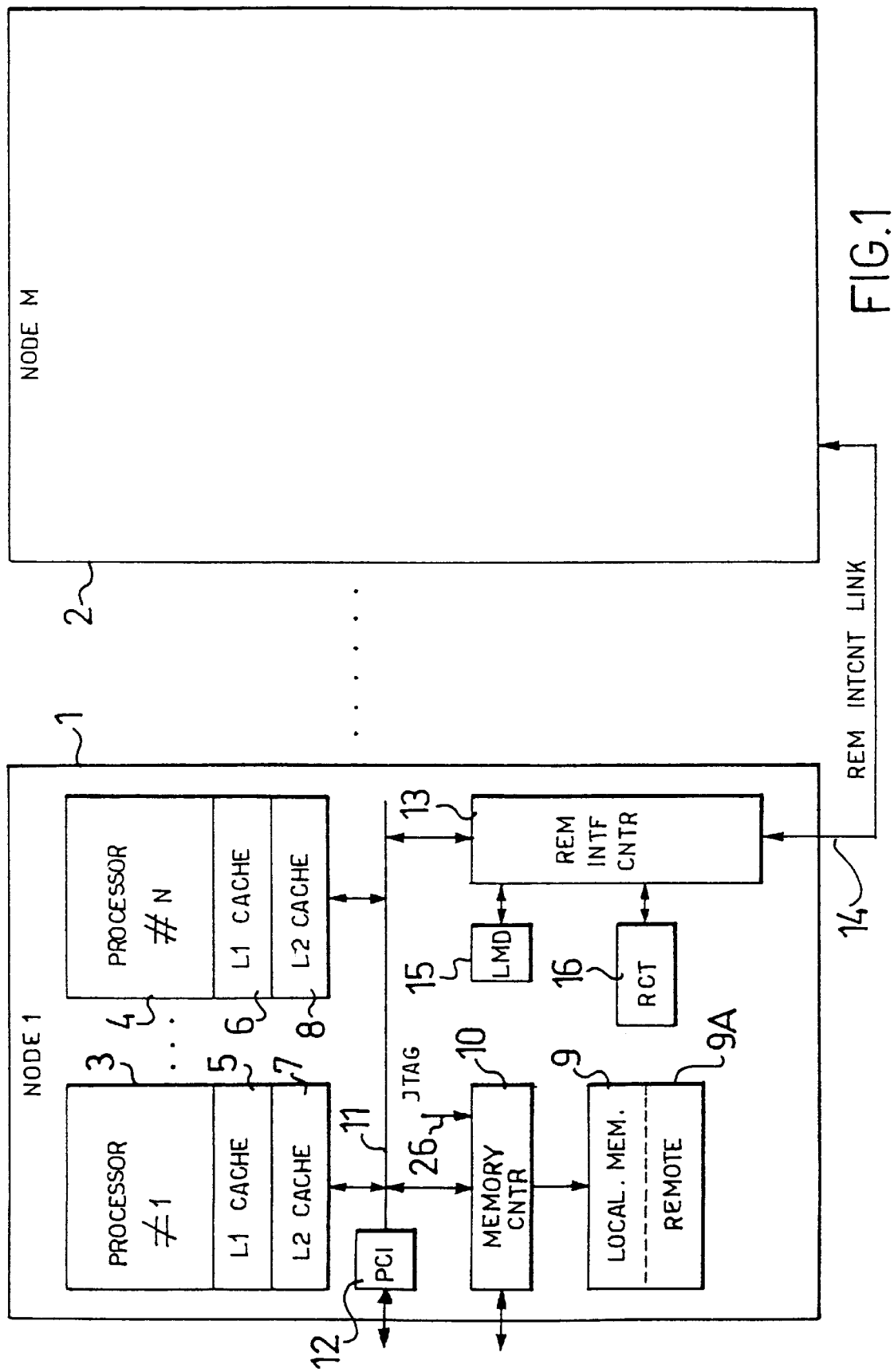
FIG. 1 is a general block diagram of a data-processing system with cc-NUMA architecture and with remote cache incorporated in the local memory of each node in accordance with the present invention.

With reference to FIG. 1, a data-processing system with cc-NUMA architecture is constituted by a plurality of M nodes, 1, 2, where M may be any number limited solely, at the design stage, by the capacities of the registers which have to be provided in each node for storing the data which describe and identify the various nodes of the system.

Each node, for example the node 1, comprises at least one processor, generally a plurality of processors 3, 4 (PROCESSOR≠1, PROCESSOR≠n) up to a maximum of N defined at design stage.

Each processor such as 3, 4 has an associated internal first-level cache (CACHE L1) 5, 6 which is generally fully associative and very fast, although of small capacity, and an external second-level cache (CACHE L2) 7, 8 which is slower but with a much larger capacity, generally of the order of 4 Mb.

The first-level cache is preferably in fact constituted by two independent caches, one for data and the other for instructions.

In the preferred embodiment every cache "entry" contains a line or block of data equal to 64 bytes so that the capacity of the second-level cache, expressed in blocks, is 64 kblocks.

Each node such as, for example, the node 1, also comprises a local memory 9 (a working memory, not to be confused with the bulk memories constituted by magnetic-disc, tape, optical or magneto-optical disc units).

The local DRAM-technology memory 9 is constituted by several modules of which variable numbers can be installed to achieve the memory capacity required for various applications, and is controlled by a configuration and control unit 10 which provides for the generation of the necessary timing and control signals and for the configuration of the memory, that is, for the definition of a one-to-one association between memory addresses and addressable locations of the various modules, according to the number and capacity of the modules installed.

In other words, one and only one location of one of the various modules is associated with each memory address.

In general, the association thus established is also unique, that is, each memory module location is accessed by one and only one memory address.

The mechanism is very simple: the configuration unit is provided with a plurality of couples of registers of which the content, which is set when the system is booted, defines a plurality of address fields by means of a lower field limit and an upper field limit.

The fact that a generic address belongs to one of the fields, which is checked by comparison with the content of the registers, causes the generation of a signal for the selection of a module, or of a group of modules if the memory is configured as interleaved.

In this second case, the decoding of a certain number of least significant address bits defines which module should be selected within the group.

The various registers may be replaced by a static memory containing a translation table which can be written upon booting and addressed by suitable address fields, and which outputs module-selection signals or codes.

An example of a configuration and control unit which operates in accordance with these criteria and configures a memory with an interleaved structure optimal for achieving good performance is described for example, in patent U.S. Pat. No. 5,668,974 and in the corresponding European publication EP-A-0629952.

It is, however, possible, with the use of configuration and control units of this type, to arrange for several addresses which differ from one another in the most significant bits to be correlated one-to-one with the same memory entry and thus to be pseudonyms (aliases) of the same address.

This property is advantageously used, as will be explained more clearly below, for mapping the remote memory space in a portion of the local memory so that this local memory portion can perform the function of a remote cache.

The local memory portion which performs this role is identified by the numeral 9A in FIG. 1.

The processors 3 and 4 are connected to the local memory 9 (via the memory control unit 10) by means of a local bus 11.

Also connected to the local bus 11 are a bridge 12 for interconnection with a secondary bus, for example, of the type known by the acronym PCI (peripheral controller interconnect), to which peripheral apparatus (bulk memory, I/O terminals, printers) is connected, and a bridge 13 for interconnecting the node 1 to the other nodes of the system via a remote interconnection channel or ring (REM INTCNT LINK) 14.

For simplicity, although the various functions may be performed by separate components, the bridge 13, which can be generally defined as a remote interface controller (REM INTF CONTR), has the task of arbitrating access to the local bus by the various processors, the bridge 12, and itself, of controlling the communication and coherence protocol of the local bus, of recognizing requests of the various processors of the node for access to a remote memory space, that is, to data stored in the local memories of other nodes, and of exchanging messages with the other nodes, via the ring 14, both for sending or receiving data and for ensuring the coherence of the data between the various nodes.

All of these aspects fall within the prior art.

A local memory directory LMD 15, preferably formed as an associative memory, is connected to the remote interface controller 13 and enables the blocks of data stored in the local memory of the node which have copies in other nodes to be identified, as well as in which nodes the copies are resident, and whether the copies have been modified.

The local memory directory LMD is accessible for reading and writing by the controller 13 in order, as already stated, to ensure coherence between the various nodes of the data belonging to the local memory space.

As well as the local memory directory, a static memory 16 which is formed in SRAM technology and is therefore fast, is provided and stores labels or TAGS relating to the blocks of data belonging to the local memory spaces of the other nodes which are also held in the remote cache 9A of the node 1.

The memory 16, which is called an RCT (remote cache tag) memory, is connected to the controller 13 and is accessible for reading and writing in order to recognize the blocks of data held in the remote cache and their state and, in dependence on these indications, to activate the necessary operations for coherence and for access both to the remote cache and to the local memories of the other nodes.

The architecture of the other nodes, such as the node 2, is identical to that described and any further description is unnecessary.

Before the operation of the system shown in FIG. 1 is considered, it is appropriate to consider how the addressable system space, or the system space, is mapped.

In data-processing systems, the data is addressed at byte level.

The number of bytes which can be addressed therefore depends on the number of bits making up the address.

Modern data-processing systems provide for the use of addresses with 32 bits or even up to 48 bits and the space for addressable data is 4 Gb (gigabytes) and 256 Tb (terabytes), respectively.

In practice, in the current state of practical embodiments, the overall capacity of a system memory does not exceed 16 Gb.

34 bits are therefore sufficient.

Figure 2:
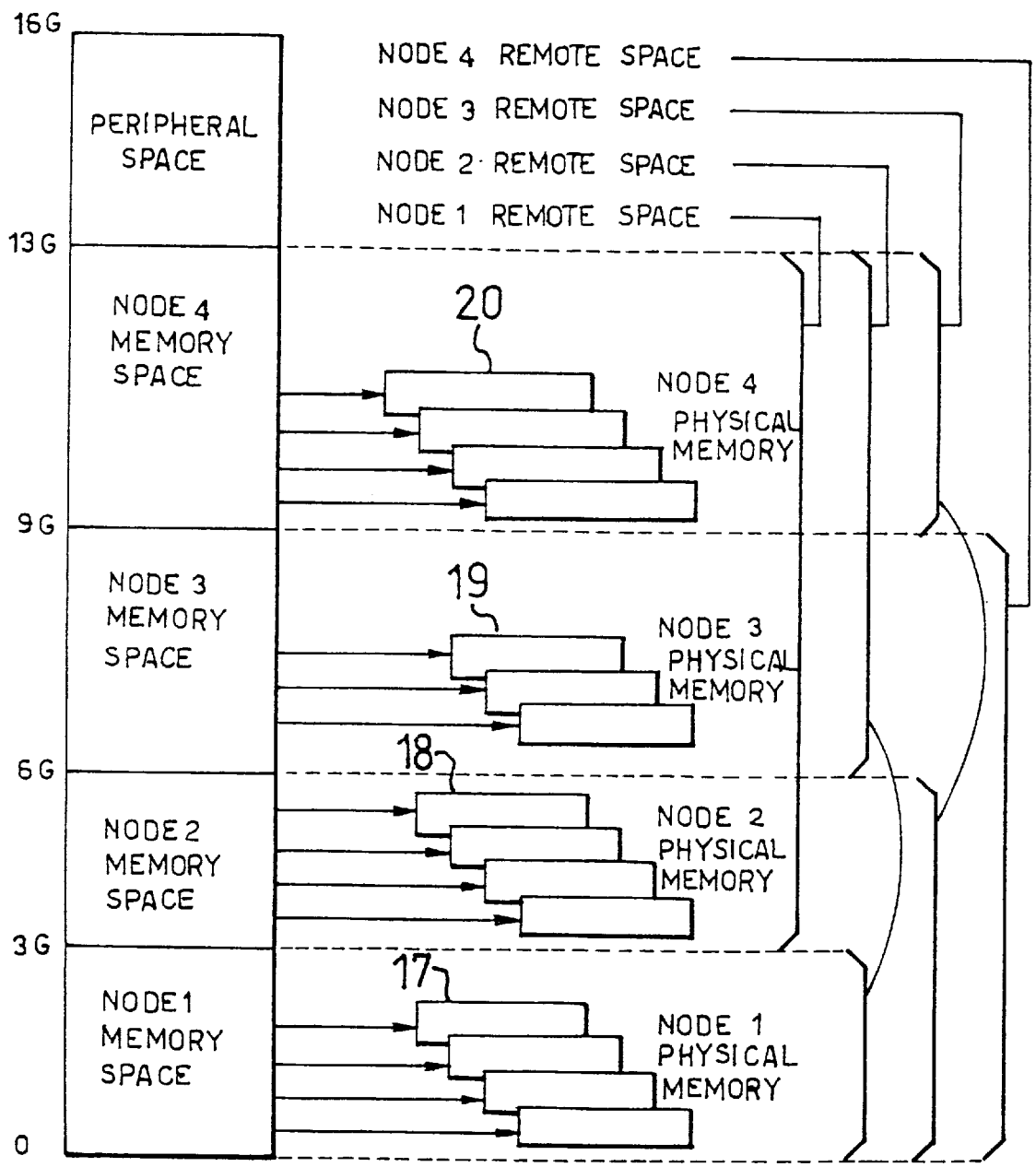
FIG. 2 is a diagram of the division and mapping of the addressable space of the system between the various nodes in a conventional cc-NUMA architecture.

FIG. 2 shows schematically by way of example, how the system space is mapped in a conventional system with cc-NUMA architecture.

For simplicity, the system space considered is limited to the field from 0 to 16 Gb and the number of nodes which the system may have is, for example, 4.

In this case, for example, the system space between 0 and 3 Gb-1 is assigned or defined as local memory space of the node 1, the system space between 3 Gb and 6 Gb-1 is assigned as local memory space of the node 2, the space between 6 Gb and 9 Gb-1 is assigned as local memory space of the node 3, and the system space between 9 Gb and 13 Gb-1 is assigned as local memory space of the node 4.

The system space between 13 Gb and 16 Gb-1 is assigned as peripheral space and is used to identify peripherals, registers and non-volatile control memories.

The division of the system space between the various nodes may be completely arbitrary and non-uniform (for example, a larger local memory space is assigned to the node in FIG. 2).

In practice, however, the division is advantageously defined in a manner such as to reduce to the minimum the number of address bits which are required to define the lower and upper limit of each local space and which, as already stated, have to be stored in suitable registers of the remote interface controller 13 of each node (FIG. 1).

In other words, a description of the entire addressable space and of the division thereof has to be stored in the remote interface controller 13 of each node and the description must necessarily be the same in all of the nodes.

In order physically to support the local memory space of each node, memory modules 17, 18, 19, 20 are installed in the various nodes.

It is not necessary for the memory modules present in the various nodes to have an overall capacity in each node equal to the local memory space assigned to each node; the capacity may be less, in which case the system space has holes (address fields) which are not supported by physical resources.

The memory configuration units 10 (FIG. 1) in the various nodes determine, on the basis of the capacities of the various modules, a unique association between the addresses of a field of the local memory space and the addressable locations of the various modules.

In each node, the remote interface controller 13 (FIG. 1) recognizes, by comparing the addresses present on the local bus with the contents of the system configuration registers mentioned, whether the addresses belong to the local memory space of the node or to the local memory space of another node, and if so of which node, so as to undertake the appropriate actions.

For each node, the whole of the local memory space of the other nodes constitutes a remote memory space NODE 1, 2, 3, REMOTE SPACE, as shown in FIG. 2.

Figure 3:
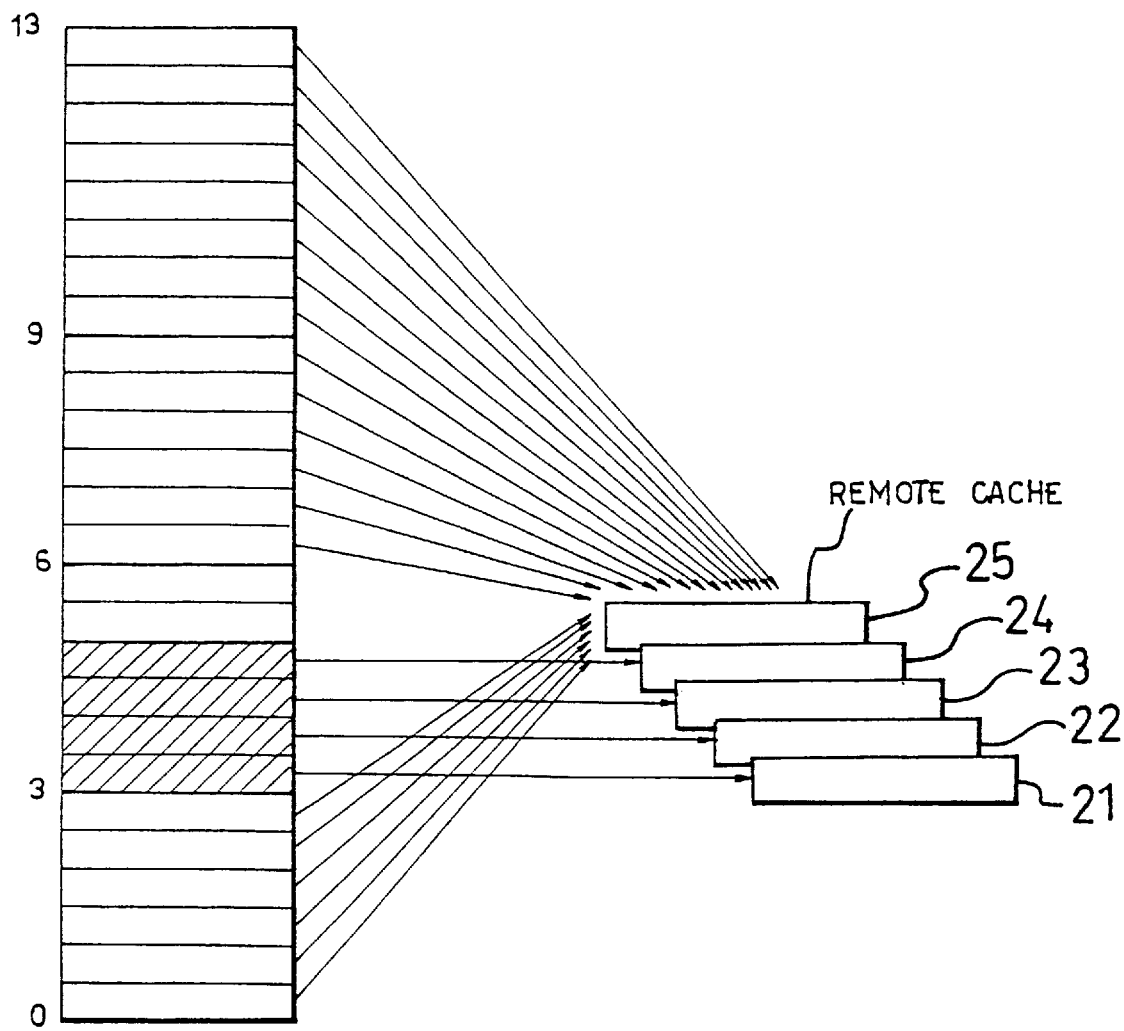
FIG. 3 is a diagram of the division and mapping of the addressable space of the system in the cc-NUMA architecture of the present invention, limited to a single node.

FIG. 3 shows schematically, by way of example, how this conventional mapping system is modified to form a cc-NUMA system with directly mapped remote cache implemented as a portion of the local memory.

For simplicity, the mapping of the memory space of the system is shown with reference to a single node, the local memory space of which is defined by the address field 3 Gb to 6 Gb-1.

Again, it is assumed, for example, that five modules 21 ... 25, each with a capacity of 0.5 Gb, are installed in the node as local memory.

Four of these modules are effectively dedicated to the storage of local data and the memory configuration unit establishes a unique association between the addresses of the address field of the local memory space, for example, between 3 Gb and 5 Gb-1 and the various addressable locations of the modules 21, 22, 23, 24.

The remaining module 25, however, is dedicated to storing, as a remote cache, data identified by addresses which belong to the remote memory space.

In this case, the memory configuration unit establishes a one-to-one but not unique association between the addresses of the remote memory space and the various addressable locations of the module 25.

Clearly, several addresses of the remote memory space are correlated with the same addressable location of the module 25 as pseudonyms of one another.

In particular, if, as already stated, the module 25 has a capacity of 0.5 Gb, the various addressable locations of the module are identified by the 29 least significant bits of a generic address (of which 29 bits a certain number of least significant bits is ignored in dependence on the memory parallelism, that is, on the number of bytes contained in one addressable location or entry of the module).

Of the 34 address bits necessary to identify one byte of data in a space of 16 Gb, the 5 most significant bits identify whether the address belongs to the local space or to the remote space.

Clearly, therefore, all of the 34-bit addresses which differ from one another solely by the 5 most significant bits, excluding those which belong to the local space, are correlated with the same entry of the module and are pseudonyms of one another.

The module 25 therefore constitutes a directly mapped cache RC for the remote memory space or, more correctly, the data section of a directly mapped cache.

In order to re-establish the unique association between the addresses and the data stored in the cache, it is necessary to associate with each cache entry a TAG which, as well as containing coherence data, contains an index, constituted by the address bits (in the example in question, the 5 most significant bits) which do not contribute to the identification of the entry.

This function is performed, as explained with reference to FIG. 1, by the fast SRAM memory 16 or RCT associated with the remote cache.

The number of modules (or even fractions of modules) which constitute the remote cache and its size can be selected at will according to requirements and can be programmed upon booting with the limitation that its maximum size cannot exceed that of the associated tag memory RCT and its minimum size cannot be less than that permitted by the width of the index field which can be stored in the associated tag memory.

An example will clarify this latter concept.

If the RCT memory is arranged for storing an index field of 10 bits and the addresses which identify one byte in the remote space comprise 34 bits, the remote cache has to have a capacity of at least $2^{(34-10)}$ bytes.

Otherwise, an index field width larger than 10 bits, which cannot be held in the RCT memory, would be required.

The optimal size of the remote cache depends on the types of applications performed by the system; if the processors belonging to various nodes operate on the same data predominantly mutually exclusively, the greater the size of the remote cache the lower will be the collision rate and the need for access to the remote space via the ring interconnecting the nodes.

However, if several processors belonging to different nodes have to operate jointly on the same data, the use of large-capacity remote caches may involve a considerable increase in the frequency of internodal coherence operations so that the advantage of having a local copy of remote data is lost to a large extent.

In addition to this disadvantage, there is the disadvantage that the use of a considerable fraction of local memory as a remote cache reduces the local memory capacity effectively available as local memory.

An advantageous aspect of the present invention is therefore that the capacity of the remote cache can be programmed upon booting in dependence on the applications, within the maximum and minimum capacity limits indicated qualitatively above.

For this purpose, it suffices, as described in the publication EP-A-0629952, for the memory control and configuration unit 10 (FIG. 1) to have a JTAG interface 26, which is well known per se, for the input of configuration data relating to the size and number of modules installed as well as other parameters, particularly the size which the remote cache of each node should have (which may differ from node to node).

Alternatively, instead of the JTAG interface, the internal registers (or the address translation memory) of the configuration unit may be regarded as a peripheral unit which can be addressed by addresses belonging to the peripheral space and can be loaded with suitable data transmitted by means of the local bus and input into the system by means of a keyboard terminals.

The operation of the system of FIG. 1 which, operatively, does not differ-substantially from that of conventional systems with cc-NUMA architecture, can now be considered briefly.

If a processor (such as the processor 3 of FIG. 1) requires, for a reading or writing operation, a datum identified by a generic address I belonging to the memory space of the system, the request is first of all sent to the first-level cache L1.

1) If the block to which the addressed datum belongs is held in L1, the operation is carried out locally.

If coherence operations are necessary (for example, for writing), the address, with the necessary coherence signals, is transmitted to the cache L2 and on the local bus.

The address I received by the remote interface controller makes it possible to establish whether the datum belongs to the local memory space (in which case it is possible to recognize whether a copy of the datum is resident in other nodes by means of the local memory directory and consequently to send suitable coherence messages thereto).

If the datum belongs to the remote space, it is possible to recognize, by means of the RCT section 16 of the remote cache, whether the datum is present as a copy in the remote cache in order to update its state in the section RCT.

2) If the block to which the addressed datum belongs is not held in L1 but is held in L2, the operation is carried out locally; moreover, as in the previous case, if coherence operations are necessary, the address is transmitted on the local bus to enable the interface controller to perform the necessary coherence operations.

3) If the block to which the addressed datum belongs is not held in L1/L2, the address of the datum transferred on the local bus enables the remote interface controller to recognize whether the addressed datum belongs to the local space or to the remote space and, in the latter case, whether the block which contains the datum is held in the remote cache or not.

If the datum belongs to the local space or is held in the remote cache, the block which contains the datum is read and retrieved into the upper-level cache (L1/L2) and, if necessary, the datum is modified.

The remote interface controller performs all of the necessary coherence operations.

It should be noted that, in known manner, if the datum addressed is held in the cache L1, L2 of another processor of the node, this cache can be substituted for the local memory and for the remote cache in providing the required datum by a procedure known as intervention.

4) Finally, if the datum addressed does not belong to the local space and is not held in the remote cache (which event is possible solely for reading operations, since writing operations presuppose the retrieval of the datum from the remote space into the remote cache) the remote interface controller generates the appropriate internodal communication messages.

The methods of operation are therefore exactly the same as those of a system with cc-NUMA architecture and the only difference consists of the fact that, when a datum is held in the remote cache, the local memory is activated to select the portion of local memory which acts as a remote cache rather than a separate remote cache.

What is claimed is:

1. A data-processing system with cc-NUMA architecture comprising a plurality of nodes each constituted by at least one processor intercommunicating with a DRAM-technology local memory by a local bus, the nodes intercommunicating by remote interface bridges and at least one intercommunication ring, the at least one processor of each node having access to a system memory space defined by memory addresses each of which identifies a block of data and one byte within the block, wherein access time by said at least one processor to said system memory is substantially greater than access time to said DRAM-technology local memory by said at least one processor, and further wherein each node comprises:
a unit for configuring a second portion of the DRAM-technology local memory as a remote cache of the node for caching remote system memory, wherein said unit uniquely maps a first portion of the system memory space, which is different for each node, onto a first portion of the DRAM-technology local memory, and maps the second portion of the system memory space which is uniquely mapped onto a portion of the DRAM-technology local memory of all of the other nodes onto said second portion of the DRAM-technology local memory, and a SRAM-technology memory for storing labels each associated with a block of data stored in said second portion of DRAM-technology local memory and each comprising an index identifying the block and bits indicating a coherence state of the block so that said second portion of DRAM-technology local memory in each node constitutes a remote cache of the node for caching said remote system memory.

2. A system according to claim 1, wherein the configuration unit comprises means for programming the size of the remote cache in each node when the system is booted.

3. A system according to claim 1, wherein the configuration unit is operable to program the size of the remote cache in each node when the system is booted.

* * * * *